July 9, 1963 H. B. KAST 3,096,618
PYROPHORIC IGNITER
Filed Aug. 22, 1960
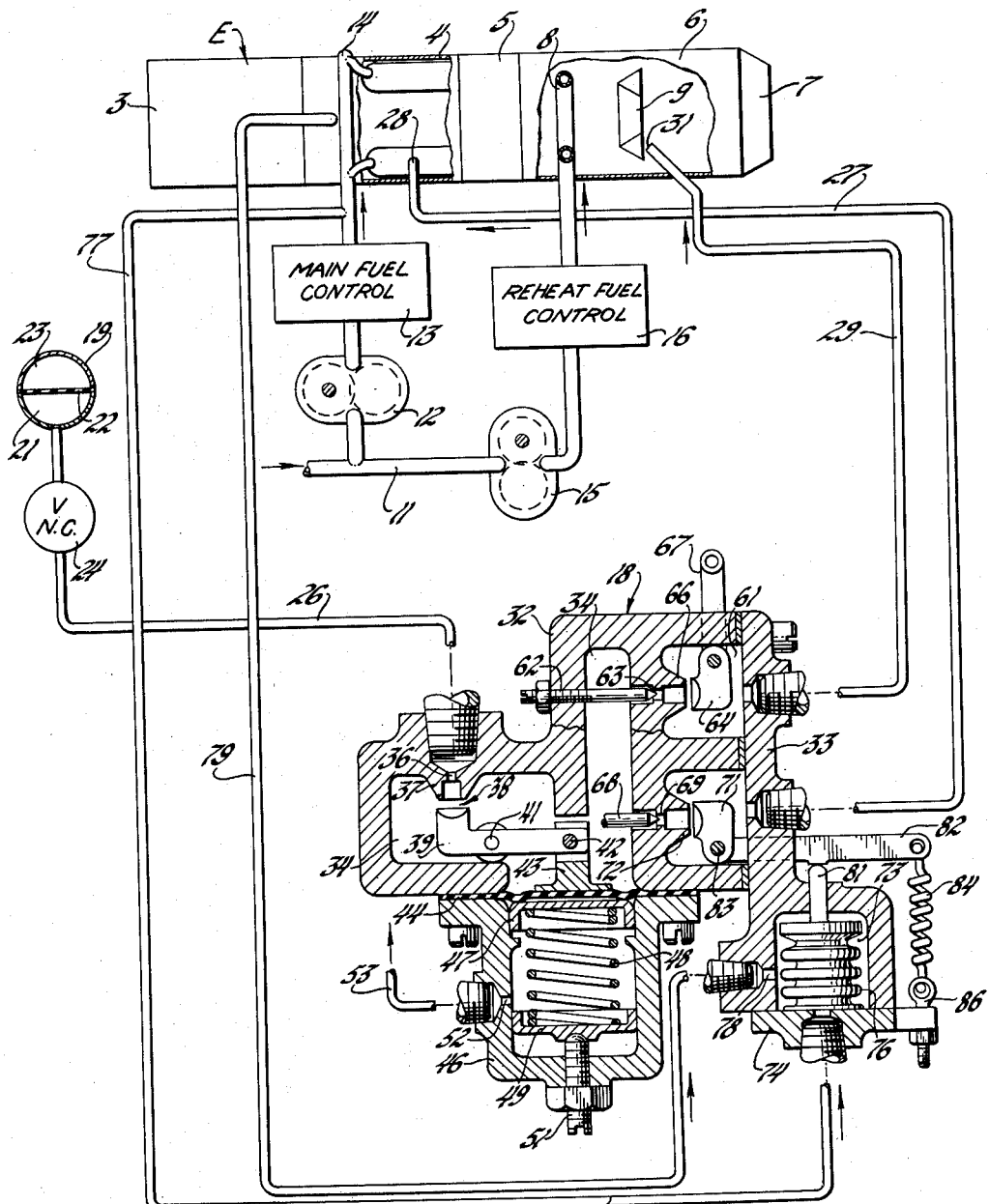
INVENTOR.
Howard B. Kast
BY
Paul Fitzpatrick
ATTORNEY ன்ப
United States Patent Office 3,096,618
Patented July 9, 1963

3,096,618
PYROPHORIC IGNITER
Howard B. Kast, Milwaukee, Wis., assignor to General Motors Corporation, Detroit, Mich., a corporation of Delaware
Filed Aug. 22, 1960, Ser. No. 51,030
7 Claims. (Cl. 60—39.82)

My invention is directed to means for igniting the fuel in gas turbine engines or jet by injection of a pyrophoric (spontaneously combustible) liquid into the engine.

As described herein, the igniter includes means for initiating combustion both in the main combustion apparatus of a gas turbine engine and in an afterburner or reheat burner. The principal objects of the invention are to provide simple and reliable apparatus for igniting jet engines which does not require any electrical apparatus and which is light in weight and well suited to the requirements of such engines.

The nature of the invention will be clear to those skilled in the art from the accompanying drawing which is a schematic diagram of the turbojet engine igniter installation embodying the invention, and the succeeding description thereof.

The FIGURE shows my invention as applied to ignition of an after-burning turbojet engine E of known type which may, as usual, include a compressor 3, main combustion apparatus or chambers 4, a turbine 5, and an exhaust duct 6 terminating in a jet nozzle 7, these being connected for gas flow through them in the order named. The turbine drives the compressor, which supplies air to the combustion apparatus, in which fuel is burned to provide the motive fluid for the turbine. The gases exhausting through the nozzle 7 provides a propulsive jet for an aircraft, for example.

The exhaust duct 6 houses an afterburner comprising a fuel manifold 8 and a flameholder 9. Fuel may be supplied at will to the afterburner to heat the turbine exhaust gases and thereby increase the thrust of the engine. The exhaust nozzle 7 is ordinarily variable in area, but such details need not be pursued.

Fuel is delivered by a main fuel line 11 supplied from any suitable source, from which fuel is pumped by a main fuel pump 12, through manifold 14 to the main combustion apparatus 4. The quantity of fuel so supplied is regulated by any suitable main fuel control 13. Fuel is supplied to the afterburner 8 by a second fuel pump 15 and a reheat fuel control 16. The pumps may be driven by the turbine 5 or otherwise.

It will be understood that the structure of the engine and the nature of the means for supplying fuel to the engine are immaterial to my invention, these being described generally merely to indicate the background of the invention. The fuel supplied through the line 11 may be any jet engine fuel which requires ignition.

My invention is embodied principally in the igniter control or igniter valve assembly 18, shown somewhat schematically but in sufficient detail to disclose the principles and nature thereof. The control device 18 is adapted to control the supply of pyrophoric igniter fuel to both of the combustion apparatus. The igniter fuel may preferably be stored in a pressure charged accumulator 19 in which the fuel may be contained in a chamber 21 below a flexible bag or diaphragm 22 kept under pressure by an inert gas such as nitrogen in the upper space 23. The accumulator may be charged to a high pressure such as 3000 or 4000 p.s.i. when it is fully charged with fuel, the pressure decreasing gradually as the igniter fuel is consumed and the gas expands.

The flow of igniter fuel from the accumulator is under control of a normally closed shutoff valve 24, which may be manually operated and is ordinarily closed when the engine is out of operation, being opened only as part of the starting procedure of the engine. From valve 24 the igniter fuel flows through line 26 to the control device 18. This device is provided to control the rate of flow of igniter fuel so that it is supplied at an economical and adequate rate, to provide for automatic shutoff of main burner igniter fuel, and to provide for manual control of afterburner ignition. The control device 18 is connected by suitable conduit 27 to a jet or nozzle at 28 in at least one of the main combustion chambers 4. When the pyrophoric fuel is injected, it ignites spontaneously and continues to burn to provide a pilot flame for ignition of the main burner. The control 18 also is connected by a line 29 to a nozzle or jet 31 suitably located in the afterburner, as in the lee of the flameholder 9. The details of the igniting jet installations need not be described since this is a matter of design of the combustion apparatus and such devices may be installed similarly to torch igniters or simple spark-type igniters.

The control 18 includes a housing or body 32 having a port to which the supply line 26 is connected and a cover 33 into which the lines 27 and 29 are connected. Fuel from the line 26 enters a chamber 34 in the body through a restriction 36 and past the seat 37 of a pressure regulating valve 38. The pressure regulating valve 38 includes a movable member 39 of the half-ball type pivoted on a fulcrum 41. Valve 39 is coupled by pin 42 and post 43 to a diaphragm 44 which is retained over an opening in the body 32 by a cylinder 46 bolted to the body. Cylinder 46 houses a piston 47 which bears against the under surface of diaphragm 44 and is biased upwardly by compression spring 48 engaging an adjustable abutment 49. The combination of diaphragm 44 and piston 47 is more rugged than a diaphragm alone, and is leakproof. A screw 51 provides for adjusting the force of spring 48 and therefore the pressure setting of the regulating valve 38, which responds to the pressure in chamber 34. As is known, increasing pressure in chamber 34 operates to close the valve 38 and restrict or shut off flow into chamber 34 to maintain the pressure at the value preset by spring 48. In this case, for example, the regulating valve may be set to reduce the igniter fuel pressure to about 600 p.s.i. This is desirable to avoid unnecessarily high pressures in the pyrophoric fuel system and also to help maintain flow of the igniter fuel substantially constant at the desired rate. The rate of flow is adjusted by needle valves to be described.

The chamber within the cylinder 46 is vented to ambient atmospheric pressure through a port 52 and, if desired, an overboard vent line 53.

As pointed out, when the valve 24 is opened, the chamber 34 fills with igniter fuel at a pressure which we have assumed, for example, to be 600 p.s.i. The fuel may flow from chamber 34 to a chamber 61 freely communicating with afterburner igniter line 29. The rate of flow is controlled by an adjustable valve needle 62 cooperating with the seat 63. The flow may be turned on and off by a half-ball valve member 64 cooperating with a seat 66 and moved into engagement with the seat by a manually operable lever 67. The valve 64 normally is closed, but may be opened through any suitable remote control mechanism by the aircraft pilot. When it is open, the rate of flow of igniter fuel is determined by the pressure in chamber 34 and the setting of the needle valve 62. Valve member 64, therefore, is not used as a throttling valve but simply as means to start and stop the flow.

The rate of flow of igniter fuel through line 27 to the main combustion apparatus is determined by a second manually adjustable needle valve 68, 69 (only partially shown) which may be identical to the valve 62, 63 previously described. The flow to line 27 is also under control of a movable valve member 71 which cooperates with a seat 72. Valve 71, 72 is actuated by a mechanism responsive to conditions which indicate that ignition of main burner fuel has taken place and the engine is in operation. A highly suitable arrangement for this purpose is provided in the form of means responsive to the excess of pressure of main burner fuel in the main fuel supply line or manifold 14 over the air pressure in the combustion apparatus, which we may call the fuel injection pressure differential.

This control allows igniter fuel to flow to the main burner from the time valve 24 is opened until the main fuel injection pressure differential indicates self-powered operation of the engine and, therefore, the existence of combustion. To provide for this control the main cover 33 defines a chamber 73 closed by a head 74. A bellows 76 mounted on the head 74 is connected by a pressure line 77 with the main fuel manifold 14 so that the bellows is subjected internally to main fuel pressure. A port 78 connected by line 79 to a pressure tap in the main combustion section 4 of the engine subjects the exterior of the bellows to the combustion air pressure. The expansion of the bellows which is proportional to the difference of these two pressures, moves a push rod 81 fixed to the free end of the bellows and slidably mounted in the cover 33. This push rod acts against a lever 82 pivoted at 83 and coupled to the valve member 71. A tension spring 84 connected between the end of the lever and an adjustable eyebolt 86 urges the valve member 71 in an opening direction. At some value of the fuel injection pressure differential, bellows 76 will overcome spring 84 and shut off the igniter fuel. This occurs rather quickly at the starting of the engine. Before valve member 71 is moved to shut off the igniter fuel, the rate of flow is determined by needle valve member 68. It will be seen, therefore, that the control device 18 provides for flow of igniter fuel at a controlled rate to both points of use, provides for manual control of afterburner ignition, and for manual initiation with automatic cut off of main burner ignition.

The orifice or restriction 36 at the point of entrance of the igniter fuel to the control 18 provides a safety backup to the pressure regulating valve. This orifice is sufficiently small to reduce the flow of igniter fuel to the igniters in the event of some casualty which makes the reducing valve ineffective. If we assume that the regulating valve 38 remains open due to some damage, the pressure in chamber 34 will be more than the normal regulated value by much less than the pressure in the accumulator 19, which initially may be something of the order of 3000 p.s.i. The orifice 36 may be small enough to reduce the pressure to something like 1200 p.s.i. with the maximum pressure in the accumulator if either of valves 64 or 71 is open. Incidentally, it may be noted that the main burner and the afterburner are never simultaneously ignited.

It will be clear from the foregoing that my invention provides a safe, simple and effective control highly suited to the ignition requirements of turbojet engines. The control is capable of dealing with various pyrophoric fuels. The favored one is a mixture composed 80% of triethylaluminum and 20% of trimethylaluminum.

The detailed description of the preferred embodiment of the invention is not to be considered as limiting the invention since many modifications within the scope of the invention may be made by the exercise of skill in the art.

I claim:

1. An igniter system for a turbojet engine having a main combustion chamber and an afterburner comprising, in combination, a source of pyrophoric fuel under pressure, a pressure regulating valve, means including fuel shutoff means and a first flow-limiting restriction connecting the source to the said valve, means including a second flow-limiting restriction and a flow-controlling valve connecting the outlet of the regulating valve to the main combustion apparatus of the engine for supplying pyrophoric fuel thereto to effect ignition therein, means responsive to main combustion chamber ignition effective to close the flow-controlling valve, means including a third flow-limiting restriction and a stop valve connecting the outlet of the regulating valve to the afterburner of the engine for supplying pyrophoric fuel thereto to effect ignition therein, and manually controllable operating means for the stop valve, the first flow-limiting restriction being of such proportions as to limit the pressure at the outlet of the regulating valve to not more than approximately twice the regulating valve setting when the regulating valve is ineffective because of a casualty thereto and either the flow-controlling valve or the stop valve is open.

2. An igniter system for a turbojet engine having a main combustion chamber and an afterburner comprising, in combination, a source of pyrophoric fuel under pressure, a pressure regulating valve, means including fuel shutoff means and a first flow-limiting restriction connecting the source to the said valve, means including a second flow-limiting restriction and a flow-controlling valve connecting the outlet of the regulating valve to the main combustion apparatus of the engine for supplying pyrophoric fuel thereto to effect ignition therein, means responsive to the excess of main fuel manifold pressure over main combustion chamber air pressure effective to move the flow-controlling valve in a closing direction means including a third flow-limiting restriction and a stop valve connecting the outlet of the regulating valve to the afterburner of the engine for supplying pyrophoric fuel thereto to effect ignition therein, and manually controllable operating means for the stop valve.

3. An igniter system for a turbojet engine having a main combustion apparatus comprising, in combination, a source of pyrophoric fuel under pressure, a pressure regulating valve, means including fuel shutoff means and a first flow-limiting restriction connecting the source to the said valve, means including a second flow-limiting restriction and a flow-controlling valve connecting the outlet of the regulating valve to the main combustion apparatus of the engine for supplying pyrophoric fuel thereto to effect ignition therein, and means responsive to a phenomenon indicative of successful initiation of combustion in the main combustion apparatus connected to the flow-controlling valve operable to close the same, the first flow-limiting restriction being of such proportions as to limit the pressure at the outlet of the regulating valve to not more than approximately twice the regulating valve setting when the regulating valve is ineffective because of a casualty thereto and the flow-controlling valve is open.

4. An igniter system for a turbojet engine having a main combustion apparatus comprising, in combination, a source of pyrophoric fuel under pressure, a pressure regulating valve, means including fuel shutoff means and a first flow-limiting restriction connecting the source to the said valve, means including a second flow-limiting restriction and a flow-controlling valve connecting the outlet of the regulating valve to the main combustion apparatus of the engine for supplying pyrophoric fuel thereto to effect ignition therein, and means responsive to the excess of main fuel manifold pressure over main combustion chamber air pressure effective to move the flow-controlling valve in a closing direction.

5. An igniter system for a turbojet engine having an afterburner apparatus comprising, in combination, a source of pyrophoric fuel under pressure, a pressure regulating valve, means including fuel shutoff means and a first flow-limiting restriction connecting the source to the said valve, means including a second flow-limiting restriction and a stop valve connecting the outlet of the regulating valve to the afterburner of the engine for supplying pyrophoric fuel thereto to effect ignition therein, and manually controllable operating means for the stop valve, the first flow-limiting restriction being of such proportions as to limit the pressure at the outlet of the regulating valve to not more than approximately twice the regulating valve setting when the regulating valve is ineffective because of a casualty thereto and the stop valve is open.

6. An igniter system as recited in claim 2, the first flow-limiting restriction being of such proportions as to limit the pressure at the outlet of the regulating valve to not more than approximately twice the regulating valve setting when the regulating valve is ineffective because of a casualty thereto and either the flow-controlling valve or the stop valve is open.

7. An igniter system as recited in claim 4, the first flow-limiting restriction being of such proportions as to limit the pressure at the outlet of the regulating valve to not more than approximately twice the regulating valve setting when the regulating valve is ineffective because of a casualty thereto and the flow-controlling valve is open.

References Cited in the file of this patent

UNITED STATES PATENTS

| | | |
|---|---|---|
| 2,736,166 | Mock | Feb. 28, 1956 |
| 2,959,007 | Gregory | Nov. 8, 1960 |

FOREIGN PATENTS

| | | |
|---|---|---|
| 472,990 | Italy | July 9, 1952 |
| 660,178 | Great Britain | Oct. 31, 1951 |